United States Patent
Benayoun et al.

(10) Patent No.: US 8,101,241 B2
(45) Date of Patent: *Jan. 24, 2012

(54) CROSSLINKING AGENT FOR A SILICONE COMPOSITION WHICH CAN BE CROSSLINKED AT LOW TEMPERATURE BASED ON A HYDROGENATED SILICONE OIL COMPRISING SI-H UNITS AT THE CHAIN END AND IN THE CHAIN

(75) Inventors: Jean-Paul Benayoun, Lyons (FR); Didier Dhaler, Tassin (FR); Jacques Kieffer, Neyron (FR); John White, Chessy les Mines (FR)

(73) Assignee: Bluestar Silicones France, Lyon Cedex (FR)

( * ) Notice: Subject to any disclaimer, the term of this patent is extended or adjusted under 35 U.S.C. 154(b) by 173 days.

This patent is subject to a terminal disclaimer.

(21) Appl. No.: 12/123,974

(22) Filed: May 20, 2008

(65) Prior Publication Data

US 2009/0149609 A1 Jun. 11, 2009

Related U.S. Application Data

(63) Continuation of application No. 10/849,466, filed on May 20, 2004, now abandoned, and a continuation of application No. PCT/FR02/03952, filed on Nov. 19, 2002.

(30) Foreign Application Priority Data

Nov. 20, 2001 (FR) ..................... 01 14996

(51) Int. Cl.
*B05D 3/02* (2006.01)
*C08L 83/04* (2006.01)
(52) U.S. Cl. ........ 427/387; 428/447; 428/480; 428/500; 525/477; 525/478; 528/15; 528/31; 528/32
(58) Field of Classification Search ............ None
See application file for complete search history.

(56) References Cited

U.S. PATENT DOCUMENTS

| | | | | |
|---|---|---|---|---|
| 4,329,275 A | * | 5/1982 | Hatanaka et al. | 524/862 |
| 5,194,489 A | * | 3/1993 | Frances et al. | 524/731 |
| 5,216,104 A | * | 6/1993 | Okami et al. | 528/15 |
| 5,241,034 A | | 8/1993 | Herzig et al. | |
| 5,629,387 A | | 5/1997 | Frances et al. | |
| 5,942,591 A | | 8/1999 | Itoh et al. | |
| 7,273,658 B2 | * | 9/2007 | Benayoun et al. | 428/447 |

FOREIGN PATENT DOCUMENTS

| | | |
|---|---|---|
| EP | 0523660 B1 | 1/1993 |
| EP | 1004632 B1 | 12/2003 |
| FR | 2704553 A1 | 11/1994 |

* cited by examiner

*Primary Examiner* — Marc Zimmer
(74) *Attorney, Agent, or Firm* — Buchanan Ingersoll & Rooney, P.C.

(57) ABSTRACT

The invention relates to crosslinkable or crosslinked silicone compositions capable of being used to form a water-repellent and release coating for a flexible support made of paper or of polymer, in particular a heat-sensitive flexible support. These compositions are of the type of those comprising crosslinking polyorganosiloxanes carrying SiH units and unsaturated, preferably vinylated, polyorganosiloxanes capable of reacting with the crosslinking agent by polyaddition in the presence of platinum to form the release crosslinked coating on the flexible support.

The targeted aim is to make possible the instantaneous crosslinking at low temperature (85-90° C.) of such silicone compositions coated on flexible supports at a very high speed. To achieve this aim, the invention provides for the use of specific crosslinking agents composed of POSs hydrogenated at the chain end and in the chain.

The invention also relates to the silicone compositions of solvent-free type or of emulsion type comprising the Si-Vi POS, the SiH POS crosslinking agent α,ω-bis(hydrodimethylsiloxyl)poly(hydromethyl)-(dimethyl)siloxane, and the platinum catalyst, inter alia.

Applications: release silicone coatings obtained by crosslinking/polyaddition for heat-sensitive flexible supports, for example polymeric films made of polyethylene.

29 Claims, 2 Drawing Sheets

CROSSLINKING AGENT FOR A SILICONE COMPOSITION WHICH CAN BE CROSSLINKED AT LOW TEMPERATURE BASED ON A HYDROGENATED SILICONE OIL COMPRISING SI-H UNITS AT THE CHAIN END AND IN THE CHAIN

CROSS-REFERENCE TO PRIORITY APPLICATIONS

This application claims priority under 35 U.S.C. §119 of FR 01/14996, filed Nov. 20, 2001, and is a continuation of U.S. patent application Ser. No. 10/849,466, filed May 20, 2004 now abondoned, and PCT/FR 02/03952 filed Nov. 19, 2002, and designating the United States, published in the French language as WO 2003/044084 A3 on May 30, 2003, each hereby expressly incorporated by reference in its entirety and each assigned to the assignee hereof.

This application is a Continuation-in-Part of PCT Application No. PCT/FR02/03952 designating the United States and filed on Nov. 19, 2002, which claims priority from French Application No. 01/14996 filed on Nov. 20, 2001, the disclosures of which are incorporated herein in their entirety by reference.

The field of the invention is that of crosslinkable or crosslinked silicone compositions capable of being used in particular to form a water-repellant and release coating or film on a fibrous or nonfibrous support, for example made of paper or the like, or alternatively made of natural or synthetic polymers.

More specifically, the invention relates to silicone compositions of the type of those comprising:
- functionalized polyorganosiloxanes (POS) carrying, on the same molecule or not, Si—H and Si-IE units with IE representing a group comprising at least one ethylenic, preferably vinyl, unsaturation; the Si—H units being capable of reacting with the Si-IE units by polyaddition;
- an appropriate metal catalyst, preferably a platinum catalyst;
- optionally at least one adhesion-adjusting system, for example based on silicone resin comprising Q ($SiO_{4/2}$) and/or T ($RSiO_{3/2}$) siloxyll units;
- optionally other additives (fillers, accelerators, inhibitors, pigments, surfactants, and the like).

The invention also relates to the preparation of silicone compositions of this type.

The invention also relates to the processes for the manufacture of articles made of crosslinked silicone, in particular coatings, e.g. water-repellent and/or release coatings, for fibrous or nonfibrous flexible supports (paper or polymer film), from the compositions targeted above.

For example, these liquid silicone compositions are applied to support films in industrial coating devices comprising rolls operating at a very high speed (for example 600 m/min). It is obvious that, in these very high-speed coating procedures, the viscosity of the liquid silicone coating composition must be precisely adapted to the coating operating conditions.

The liquid silicone coating compositions of more particular interest in the context of the invention are solvent-free.

According to an alternative form, the silicone phase of these liquid silicone coating compositions can be diluted in a solvent. According to another more advantageous alternative form, in particular for reasons of health and safety, the liquid silicone composition is an aqueous dispersion/emulsion.

In practice, the degree of deposition of release silicone is between 0.1 and 2 $g/m^2$, preferably 0.3 and 1 $g/m^2$, which corresponds to thicknesses of the order of a micrometer.

Once applied to the flexible support, the silicone composition crosslinks to form a firm, release and/or water-repellent, coating made of silicone (e.g. elastomer).

In view of the very high-speed industrial coating rates, the kinetics of crosslinking have to be instantaneous and the crosslinking has to be correct, that is to say that the release silicone films have to be sufficiently crosslinked to be able to fulfil as best as possible their release role and to possess the desirable mechanical qualities. The assessment of the quality of the crosslinking of the release silicone film can be carried out in particular through quantitative determination of the uncrosslinked extractable compounds, the amount of which must be as small as possible.

The ability to release of the free outer face of the silicone coating is expressed through the detachment force, which has to be weak and controlled, for the element intended to be positioned on the support coated by the release silicone film. Conventionally, this element can be the adhesive face of a label or of a tape of the same kind.

Thus, in addition to this weak and controlled detachment force, the adhesion of the silicone coating to its support has to be very high. This property of adhesion is assessed, for example, using the rub off trade test, which consists in rubbing the surface of the coating with a finger and then measuring the number of successive passes which result in damage to the coating.

It is also important for these silicone coating compositions which can be crosslinked by hydrosilylation, e.g. ≡SiH/≡SiVi, to have a lifetime at ambient temperature which is as long as possible, when they are in the form of a coating bath in industrial coating devices.

The flexible supports coated with a release silicone film can be, for example:
- an adhesive tape, the inner face of which is coated with a layer of pressure-sensitive adhesive and the outer face of which comprises the release silicone coating;
- or a paper or a polymer film for protecting the adhesive face of a self-adhesive element or pressure-sensitive adhesive;
- or a polymer film of the Poly(Vinyl Chloride) (PVC), PolyPropylene, PolyEthylene or PolyEthylene Terephthalate) type.

In the case of solvent-free liquid silicone systems which crosslink by polyaddition (Si—H/Si-alkenyl-Vi-), crosslinking is carried out under thermal activation. These reaction conditions are not suitable for some heat-sensitive supports, such as those comprising polyethylene (PE), such as, for example, PE films or paper coated with PE, or those of the thermally printable paper type. These heat-sensitive supports do not withstand being heated to temperatures of greater than 90° C. All the difficulty thus lies in obtaining, for these heat-sensitive supports, correct crosslinking at low temperature, for example of less than or equal to 110° C. (85-90° C.).

The use of crosslinking agents of the type of those comprising siloxyl units: dimethylhydrosiloxyl (M'), methylhydrosiloxyl (D'), dimethylsiloxyl (D) and trimethylsiloxyl (M), for liquid silicone compositions which can be crosslinked by polyaddition (≡SiH/SiVinyl), to form release coatings on flexible supports (coated or uncoated paper, polymer films, and the like), is generally already disclosed.

This is thus the case in Patent Application EP A-0 523 660, which discloses silicone compositions which can be crosslinked in a few seconds at temperatures below 100° C. and which comprise network (nonlinear) ≡Si-Vi POS resins and ≡SiH POS crosslinking agents of MD', MDM' type. It is not at all shown in this document that the crosslinking of the silicone films obtained is correct. The level of extractables is not measured in the examples.

EP-A-0 523 660 does not relate to a specific ≡SiH POS crosslinking agent which confers advantageous properties on the crosslinked coating in terms of reduced level of extractables and of duration of stability of the bath of liquid silicone coating composition, in particular.

In this context, an essential object of the present invention is to provide a novel use of specific ≡SiH POSs as crosslinking agents in liquid silicone coating compositions which can be crosslinked instantaneously at low temperature (≦110°, preferably ≦100° C., e.g. of the order of 85/90° C.) to give a release and/or water-repellent coating for a flexible support, while resulting in crosslinked silicone coatings of very good quality characterized by reduced levels of extractables.

Another essential object of the invention is to provide a novel use of specific ≡SiH POSs as crosslinking agents in liquid silicone coating compositions which can be crosslinked instantaneously at low temperature to give a release and/or water-repellent coating for a flexible support, while exhibiting long bath lifetimes at ambient temperature.

Another essential object of the invention is to provide a novel use of specific ≡SiH POSs as crosslinking agents in liquid silicone coating compositions which can be crosslinked instantaneously at low temperature to give a release and/or water-repellent coating for a flexible support and which result in correctly crosslinked silicone coatings having entirely satisfactory release properties.

Another essential object of the invention is to provide a novel use of specific ≡SiH POSs as crosslinking agents in liquid silicone coating compositions which can be crosslinked instantaneously at low temperature to give a release and/or water-repellent coating for a flexible support and which result in correctly crosslinked silicone coatings having entirely satisfactory attachment properties.

Another essential object of the invention is to provide a novel use of specific ≡SiH POSs as crosslinking agents in liquid silicone coating compositions which can be crosslinked instantaneously at low temperature to give a release and/or water-repellent coating for a flexible support and which result in correctly crosslinked silicone coatings having entirely satisfactory mechanical properties.

Another essential object of the invention is to provide a novel use of specific ≡SiH POSs as crosslinking agents in liquid silicone coating compositions which can be crosslinked instantaneously at low temperature to give a release and/or water-repellent coating for a flexible support and which result in correctly crosslinked silicone coatings having entirely satisfactory water-repelling properties.

Another essential object of the invention is to provide a novel liquid silicone coating composition which can be crosslinked instantaneously at low temperature to give a release and/or water-repellent coating for a flexible support, this composition additionally having the same qualities as those mentioned above for the use.

Another essential object of the invention is to provide a novel liquid silicone coating composition which can be crosslinked instantaneously at low temperature to give a release and/or water-repellent coating for a flexible support, this composition additionally being easy to prepare and economical.

Another essential object of the invention is to provide a process for the production at low temperature of release and/or water-repellent crosslinked silicone coatings on heat-sensitive flexible supports.

These objects, among others, are achieved by the present invention, which relates first to a novel use as crosslinking agent, in a silicone composition capable of crosslinking by polyaddition to form a water-repellent and release coating for a fibrous or nonfibrous support,
→ of at least one silicone oil,
comprising at least one hydrogenated (preferably linear) PolyOrganoSiloxane (POS) exhibiting, per molecule, at least three hydrogen atoms bonded to silicon atoms, and having the following mean linear formula:

$$M_\alpha M'_\beta D_\gamma D'_\delta$$

with $M=(R^1)_3SiO_{1/2}$
$M'=H_a(R^1)_bSiO_{1/2}$, a+b=3, a=1, 2 or 3,
b=0 to 3
$D=(R^2)_2SiO_{2/2}$
$D'=HR^3SiO_{2/2}$
$0≦\alpha≦2$
$0<\beta≦2$
$0<\gamma$
$0<\delta$
and with:
→ $0<\gamma/\delta$, preferably $0<\gamma/\delta≦1.8$,
and more preferably still $0<\gamma/\delta≦1.5$;
→ $15≦(\beta/\delta)\times1000≦150$, preferably
$15≦(\beta/\delta)\times1000≦80$,
and more preferably still
$15≦(\beta/\delta)\times1000≦60$;
the POS or POSs of higher viscosity of the said composition having a dynamic viscosity η at 25° C. of less than or equal to 1500 mPa·s.

The use according to the invention of carefully selected ≡SiH POS crosslinking agents makes it possible to produce release coatings on heat-sensitive supports, such as polyethylene (PE). By virtue of the invention, correct crosslinking of the coating is provided at a low temperature, for example 90° C., under industrial coating conditions.

Furthermore, these novel ≡SiH POS crosslinking agents do not modify the rheological behaviour of the silicone composition, so that it is perfectly capable of being coated on any support and in particular on any flexible support.

This final property is all the more advantageous as, in the context of the invention, the silicone coating compositions can advantageously be "solvent-free". This means that they are devoid of solvent and in particular of organic solvent. The advantages which this provides regarding health and safety are easily understood.

The performance achieved by virtue of the invention in terms of quality of the crosslinking by polyaddition: reactivity/level of crosslinking/kinetics, are entirely advantageous, as testified thereto by the low levels of extractables obtained, as regards the reactivity and the level of crosslinking.

The formula of the ≡SiH POS crosslinking agent indicated above is an overall formula which covers:
♦ -a- the cases where the ≡SiH POS crosslinking agent comprises the MM'DD' units on the same (preferably linear) POS molecule, it being possible for the crosslinking agent to comprise one or more different MM'DD' molecules,
♦ -b- the cases where the ≡SiH POS crosslinking agent is formed by a mixture of (preferably linear) POS molecules each carrying a portion of the MM'DD' units,
♦ -c- the cases where the ≡SiH POS crosslinking agent is formed by a mixture of (preferably linear) ≡SiH POS crosslinking agents of -a- and -b- types as described above.

Mention may be made, as examples of ≡SiH POS crosslinking agents of -b- type, of mixtures of ≡SiH POS comprising M and D' units and of POS comprising M, D and D' units, or mixtures of ≡SiH POS comprising M and D units and of POS comprising M', D and D' units, or mixtures of ≡SiH POS comprising M and D' units and of POS comprising M and D units, or mixtures of ≡SiH POS comprising M' and D' units and of POS comprising M and D units.

Preferably, the silicone composition involved in the use according to the invention is composed of ≡SiH POS and of ≡Si-alkenyl (e.g. Vi) POS with a linear, optionally branched, structure, with the exclusion of ≡SiH POS and of ≡Si-alkenyl (e.g. Vi) POS having a network crosslinked structure.

According to an advantageous form of the invention, the support intended to be coated is made of a heat-sensitive material, preferably a flexible material, and more preferably still is chosen from flexible supports comprising polyethylene and/or poly(ethylene terephthalate) and/or polypropylene and/or poly(vinyl chloride) and/or from thermally printable flexible supports; polyethylene films and paper coated with polyethylene being very especially preferred.

According to the invention, for the crosslinking of the coating, the support coated with the polyaddition silicone composition is placed at a temperature of less than or equal to 110° C., preferably of less than or equal to 100° C. and more preferably still of between 75 and 95° C., for less than 60 seconds, preferably less than 10 seconds.

Advantageously, the silicone composition is a mixture formed of:
(I.1) at least one POS exhibiting, per molecule, at least two alkenyl groups (preferably $C_2$-$C_6$ alkenyl groups) bonded to silicon atoms,
(I.2) at least one crosslinking ≡SiH POS as defined above,
(I.3) and/or at least one POS carrying Si-alkenyl and Si—H units,
(II) at least one catalyst (II) composed of at least one metal belonging to the platinum group.

Preferably, use is made of at least one POS (I.1) of Si-alkenyl type, for example Si-Vi type, and of at least one POS (I.2) of Si—H type.

The POS (I.1) is, by weight, one of the essential constituents of the formulation.

Advantageously, this POS (I.1) is a product comprising units of formula:

(I.1)

in which:
W is an alkenyl group, preferably a vinyl or allyl group,
Z is a monovalent hydrocarbonaceous group which has no unfavourable effect on the activity of the catalyst and which is preferably chosen from alkyl groups having from 1 to 8 carbon atoms inclusive, advantageously from the methyl, ethyl, propyl and 3,3,3-trifluoropropyl groups, and from aryl groups, advantageously from the xylyl, tolyl and phenyl radicals,
a is 1 or 2, b is 0, 1 or 2 and a+b is between 1 and 3.

It is advantageous for this polydiorganosiloxane to have a viscosity (at 25° C.) at least equal to 10 mPa·s, preferably between 50 and 1000 mPa·s.

All viscosities concerned with in the present account correspond to a dynamic viscosity quantity at 25° C. referred to as "newtonian", that is to say the dynamic viscosity which is measured, in a way known per se, at a shear rate gradient which is sufficiently low for the viscosity measured to be independent of the rate gradient.

The polyorganosiloxane (I.1) can exhibit a linear, branched or cyclic structure. Its degree of polymerization is preferably between 2 and 5000.

Examples of siloxyll units of formula (I.1) are the vinyldimethylsiloxane unit, the vinylphenylmethylsiloxane unit and the vinylsiloxane unit.

Examples of polyorganosiloxanes (I.1) are dimethylpolysiloxanes comprising dimethylvinylsilyl ends, methylvinyldimethylpolysiloxane copolymers comprising trimethylsilyl ends, methylvinyldimethylpolysiloxane copolymers comprising dimethylvinylsilyl ends, or cyclic methylvinylpolysiloxanes.

The polyorganosiloxane (I.2) is preferably of the type of those comprising siloxyll units of formula:

(I.2)

in which:
L is a monovalent hydrocarbonaceous group which has no unfavourable effect on the activity of the catalyst and which is preferably chosen from alkyl groups having from 1 to 8 carbon atoms inclusive, advantageously from the methyl, ethyl, propyl and 3,3,3-trifluoropropyl groups, and from aryl groups, advantageously from the xylyl, tolyl and phenyl radicals,
d is 1 or 2, e is 0, 1 or 2 and d+e has a value of between 1 and 3.

The dynamic viscosity $\eta_d$ (at 25° C.) of this polyorganosiloxane (I.2) is $\geq 5$, preferably $\geq 10$, and more preferably still is between 20 and 1000 mPa·s.

The polyorganosiloxane (I.2) can exhibit a linear, branched or cyclic structure. The degree of polymerization is greater than or equal to 2. More generally, it is less than 5000.

Examples of units of formula (I.2) are: M': $H(CH_3)_2SiO_{1/2}$, D': $HCH_3SiO_{2/2}$, D': $H(C_6H_5)SiO_{2/2}$.

Examples of polyorganosiloxane (I.2) are:
M'DD': dimethylpolysiloxanes comprising hydrodimethylsilyl ends, poly(dimethylsiloxane)-(methylhydrosiloxyl) α,ω-dimethylhydro-siloxane,
MDD': copolymers comprising dimethyl(hydromethyl) polysiloxane (dimethyl) units comprising trimethylsilyl ends,
M',DD': copolymers comprising dimethyl-(hydromethyl) polysiloxane units comprising hydrodimethylsilyl ends,
MD': hydromethylpolysiloxanes comprising trimethylsilyl ends,
D'$_4$: cyclic hydromethylpolysiloxanes.

The polyaddition silicone composition bases may comprise only linear polyorganosiloxanes (I.1) and (I.2), such as, for example, those disclosed in patents: U.S. Pat. Nos. 3,220, 972, 3,697,473 and 4,340,709.

The catalysts (II) are also well known. Use is preferably made of platinum and rhodium compounds. It is possible in particular to use the complexes of platinum and of an organic product disclosed in patents U.S. Pat. Nos. 3,159,601, 3,159, 602 and 3,220,972 and European Patents EP-A-0 057 459, EP-A-0 188 978 and EP-A-0 190 530, or the complexes of platinum and of vinylated organosiloxanes disclosed in patents U.S. Pat. Nos. 3,419,593, 3,715,334, 3,377,432 and 3,814,730. The catalyst generally preferred is platinum. In this case, the amount by weight of catalyst (II), calculated as weight of platinum metal, is generally between 2 and 400 ppm, preferably between 5 and 200 ppm, based on the total weight of the polyorganosiloxanes (I.1) and (I.2).

Preferably, the crosslinking POS exhibits an ≡SiH/≡Si-alkenyl (Vi) molar ratio such that:

$1.0 \leq \equiv SiH/\equiv Si\text{-alkenyl (Vi)} \leq 4$ preferably $1.4 \leq \equiv SiH/\equiv Si\text{-alkenyl (Vi)} \leq 3$.

It is advantageous for the POS (I.1) to be a blocked linear polydiorganosiloxane comprising "Si-alkenyl" functional groups, preferably located at the chain end, exhibiting a viscosity of the order of 100 to 1000 mPa·s and a level of alkenyl functional groups La, expressed as equivalent number of alkenyl functional groups per 100 g of oil, of:

$0.01 \leq La$ preferably $0.015 \leq La \leq 0.04$ and more preferably still $0.015 \leq La \leq 0.1$.

Likewise, the oil of use as crosslinking agent comprising at least one POS comprising ≡SiH functional groups (I.2) exhibits, preferably, a viscosity of the order of 5 to 150 mPa·s.

The complete curable compositions are fluid at standard temperature; their viscosity is generally of the order of 50 to 500 mPa·s at 25° C.

According to an alternative form, the release crosslinkable silicone composition includes:
- at least one adhesion-adjusting system;
- and/or at least one agent for inhibiting hydrosilylation, preferably chosen from acetylenic alcohols and/or diallyl maleates and their derivatives;
- optionally at least one other additive chosen from bactericides and/or antigelling agents and/or wetting agents and/or antifoaming agents and/or fillers and/or synthetic latexes and/or colorants and/or acidifying agents.

The adhesion-adjusting system is selected from known systems. It can be those disclosed in French Patent FR-B-2 450 642, U.S. Pat. No. 3,772,247 or European Patent Application EP-A-0 601 938. Mention may be made, by way of examples of the adjusting systems based:
  o on 96 to 85 parts by weight of at least one reactive polyorganosiloxane resin (A) of type: MD$^{Vi}$Q, MM$^{Vi}$Q, MD$^{Vi}$T, MM$^{hexenyl}$Q or MM$^{allyloxypropyl}$Q,
  o on 4 to 15 parts by weight of at least one nonreactive resin (B) of type: MD'Q, MDD'Q, MDT', MQ or MDQ.

The retardant of the addition reaction (crosslinking inhibitor) can, for its part, be chosen from the following compounds:
polyorganosiloxanes, advantageously cyclic polyorganosiloxanes, which are substituted by at least one alkenyl, tetramethylvinyltetrasiloxane being particularly preferred,
pyridine,
organic phosphines and phosphites,
unsaturated amides,
alkylated maleates,
and acetylenic alcohols.

These acetylenic alcohols (cf. FR-B-1 528 464 and FR-A-2 372 874), which are among the preferred thermal blockers for the hydrosilylation reaction, have the formula:

$R^1$—$(R^2)C(OH)$—C≡CH in which formula,
$R^1$ is a linear or branched alkyl radical or a phenyl radical;
$R^2$ is H, a linear or branched alkyl radical or a phenyl radical;
it being possible for the $R^1$ and $R^2$ radicals and the carbon atoms situated α to the triple bond optionally to form a ring; the total number of carbon atoms present in $R^1$ and $R^2$ being at least 5, preferably from 9 to 20.

The said alcohols are preferably chosen from those exhibiting a boiling point of greater than 250° C. Mention may be made, by way of examples, of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

These α-acetylenic alcohols are commercial products.

Such a retardant is present in a proportion of 3000 ppm at most, preferably in a proportion of 100 to 2000 ppm, with respect to the total weight of the organopolysiloxanes (I.1) and (I.2).

According to another implementational route different from the "solvent-free" one, the composition is provided in the form of an aqueous emulsion/dispersion and then comprises at least one surfactant and optionally at least one agent for fixing the pH.

The agent for fixing and maintaining the pH is preferably a buffer system comprising $HCO_3^-/CO_3^{2-}$ and/or $H_2PO_4^-/HPO_4^{2-}$. Thus, in order to obtain the desired buffer effect, it will be advisable to introduce, in accordance with the invention, an $HCO_3^-$ and/or $H_2PO_4^-$ salt, such as, for example, $NaHCO_3$ and/or $Na_2CO_3$ and/or $NaH_2PO_4$ and/or $Na_2HPO_4$. It is obvious that any other salt with a different counteranion (e.g. K) might be suitable. In a particularly preferred way, use is in practice made of a buffer system composed of $NaHCO_3$ which is incorporated in the emulsion.

The surfactant or surfactants capable of being present in the emulsion according to the invention as emulsifying agent are nonionic or ionic in nature.

According to an advantageous arrangement, the proportion of water in the emulsion is greater than or equal to 50% by weight, preferably greater than or equal to 55% by weight and, for example, in practice of the order of 55-60% by weight or alternatively of 85 to 90% by weight.

According to another of its subject-matters, the invention relates to a silicone composition capable of crosslinking by polyaddition to form a water-repellent and release coating for a fibrous or nonfibrous support, characterized:
in that the composition comprises:
  ✦ (I.1) at least one POS exhibiting, per molecule, at least two alkenyl groups (preferably $C_2$-$C_6$ alkenyl groups) bonded to silicon atoms,
  ✦ (I.2) at least one silicone oil:
    comprising at least one hydrogenated linear PolyOrganoSiloxane (POS) exhibiting, per molecule, at least three hydrogen atoms bonded to silicon atoms, and having the following mean linear formula:

$M_\alpha M'_\beta D_\gamma D'_\delta$ with $M=(R^1)_3SiO_{1/2}$
$M'=H_a(R^1)_bSiO_{1/2}$, a+b=3, a=1, 2 or 3, b=0 to 3
$D=(R^2)_2SiO_{2/2}$
$D'=HR^3SiO_{2/2}$
$0 \leq \alpha \leq 2$
$0 < \beta \leq 2$
$0 < \gamma$
$0 < \delta$
and with:
→ $0 < \gamma/\delta$, preferably $0 < \gamma/\delta \leq 1.8$, and more preferably still $0 < \gamma/\delta \leq 1.5$;
→ $15 \leq (\beta/\delta) \times 1000 \leq 150$, preferably $15 \leq (\beta/\delta) \times 1000 \leq 80$, and more preferably still $15 \leq (\beta/\delta) \times 1000 \leq 60$;
  ✦ at least one catalyst (II) composed of at least one metal belonging to the platinum group;

and in that the POS or POSs of higher viscosity which it comprises has (have) a dynamic viscosity η at 25° C. of less than or equal to 1500 mPa·s.

To define the composition according to the invention, reference is made to the characteristics defined above in the context of the description of the use.

According to another of its aspects, the present invention relates to a process for the preparation of a silicone composition which can be used in particular as coating base for the preparation of release and water-repellent coatings, this composition being of the type of that defined above. According to this process, at least one (preferably linear) ≡Si-Vi POS oil (I.1) is mixed with the crosslinking agent composed of at least one ≡Si—H POS oil (I.2) of MM'DD' type and/or of a mixture of oils comprising (preferably linear) POS molecules each carrying a portion of the MM'DD' units present in the crosslinking agent. The catalyst (II) is also incorporated in the silicone phase with the optional other ingredients, such as the crosslinking inhibitors.

The mixing means and methodologies are known to a person skilled in the art, whether solvent-free or emulsion compositions.

These compositions can be applied using devices employed on industrial equipment for the coating of paper, such as a five-roll coating head, an air knife system or an equalizer bar system, to flexible supports or materials and can then be cured by moving through tunnel ovens heated to 70-200° C.; the passage time in these ovens depends on the temperature; this time is generally of the order of 5 to 15 seconds at a temperature of the order of 100° C. and of the order of 1.5 to 3 seconds at a temperature of the order of 180° C.

The said compositions can be deposited on any flexible material or substrate, such as paper of various types (supercalendered, coated, and the like), board, cellulose sheets, metal sheets, plastic films (polyester, polyethylene, polypropylene, and the like), and the like.

The amounts of compositions deposited are of the order of 0.5 to 2 g per m$^2$ of surface to be treated, which corresponds to the deposition of layers of the order of 0.5 to 2 μm.

The materials or supports thus coated can subsequently be brought into contact with any pressure-sensitive adhesive material of rubber, acrylic or other nature. The adhesive material is then easily detachable from the said support or material.

According to another of its aspects, the present invention relates to a support, characterized in that it comprises at least one release coating obtained:
- ■ in accordance with the use as defined above,
- ■ and/or from a composition as defined above.

The following examples are given by way of indication and may not be regarded as a limitation on the scope and spirit of the invention.

EXAMPLES

The coating of silicone on a Rotomec pilot-scale coating plant at 100 m/min (residence time of 3.6 s in the ovens) on a glassine 9564 support or on OPP CR 30 at different oven temperatures.

The temperature of the silicone layer is measured in-line using an infrared camera.

The coating, after coating and crosslinking, is characterized by the following tests:

weight of the silicone coating: the silicon atoms of the coating are excited using a radioactive source or an X-ray fluorescence tube and the X-ray intensity reemitted by the coating is measured. The weight of the silicone coating is thus determined using a calibration curve. The device used is a Lab X1000 device sold by Oxford.

Level of extractables (at the outlet of the coating device: in-line/4 days after crosslinking: off-line): the test consists in immersing the coating in toluene and in then quantitatively determining by atomic absorption spectrophotometry Perkin-Elmer 3100 (APL/AA/T173); on a coating at the outlet of the coating device (in-line).

The level of silicone extractable from the coating is determined using a calibration curve.

Crosslinking: the level of polymerization of the coating at the outlet of the coating device is described using a number of trade tests: the smear test, where the oily nature of the surface is described by passing the finger over the silicone surface, and the rub off test, which characterizes the attachment to the support. In practice, the finger is rubbed over the surface of the coating and the number of passes starting from which the coating deteriorates/detaches is recorded. A grading of 10 (10 passes) is regarded as acceptable for the application.

Detachment force: the test used corresponds to the Finat No. 3 and 10 standards of edition No. 5 of 1999. This test is carried out 4 days after crosslinking (off-line) with adhesive tapes sold under the Tesa® 7475 trademark at 23° C. (acrylic base) and the Tesa® 7476 trademark at 70° C. (rubber base).

Monitoring of the performance of pressure-free instantaneous adhesion, tack, of the PSA after contact with the silicone coating according to the No. 9 standard of the Finat edition No. 5 of 1999.

Products Used:
- ● Oil vinylated at the chain end (I.1): polydimethylsiloxane oil vinylated in the α and ωpositions with 0.022 mol/100 g of Vi and with a viscosity of 25° C. of 200 mPa·s. This oil comprises 0.15% of ethynylcyclohexanol inhibitor.
- ● Hydrogenated PDMS silicone oil (I.2.1) having the structure MD'xDyM with 1 mol of hydrogen/100 g.
- ● Hydrogenated PDMS oil (I.2.2) having the structure MD'xM and comprising 1.5 mol of hydrogen per 100 g of structure MD'xM.
- ● Hydrogenated PDMS oil (I.2.3) having the strucure M'MD'xDyM'M and comprising 0.7 mol of hydrogen per 100 g.
- ● Catalyst (II): Karstedt Pt comprising 3000 ppm of Pt, sold under the Silcolease® 11091M trademark by Rhodia Silicones.

The tests and their results:

-A- TESTS 1 TO 11

TABLE 1

| Test No. | POS (I.1) | POS (I.2.1) | POS (I.2.2) | POS (I.2.3) | Catalyst (II) | $\gamma/\delta = D/D'$ | $\beta/\delta \times 1000 = (M'/D') \times 1000$ | SE (%) |
|---|---|---|---|---|---|---|---|---|
| 1 | 100 | 4.6 | — | — | 4.4 | 1.5 | 0 | 27 |
| 2 | 100 | — | — | 6.9 | 4.5 | 1.2 | 36 | 3.5 |
| 3 | 100 | 2.9 | — | 2.6 | 4.4 | 1.28 | 22.7 | 7.5 |
| 4 | 100 | — | 1.0 | 4.8 | 4.5 | 0.80 | 23.2 | 4.0 |
| 5 | 100 | 1.0 | — | 5.5 | 4.4 | 1.08 | 28 | 4.5 |
| 6 | 100 | 2.3 | — | 3.5 | 4.4 | 0.86 | 17.4 | 7.5 |
| Countertest 7 | 100 | 3.5 | — | 1.7 | 4.4 | 0.66 | 7.96 | 11.0 |
| 8 | 100 | — | 1.0 | 4.8 | 4.5 | 0.80 | 23.2 | 4.0 |
| 9 | 100 | — | 1.2 | 5.9 | 4.0 | 0.80 | 23.2 | 4.0 |
| 10 | 100 | — | 1.4 | 6.9 | 4.0 | 0.80 | 23.2 | 4.0 |
| 11 | 100 | — | 1.6 | 8.0 | 4.0 | 0.80 | 23.2 | 5.0 |

1. Reactivity

The level of extractables is measured as a function of the temperature of the paper. The results are given in Table 1 and in the appended FIG. 1, which shows the level of silicone extractables as a function of the temperature of the flexible paper support for Tests 1 to 4, the crosslinking being carried out at a low temperature of 85° C.

Figure 1:
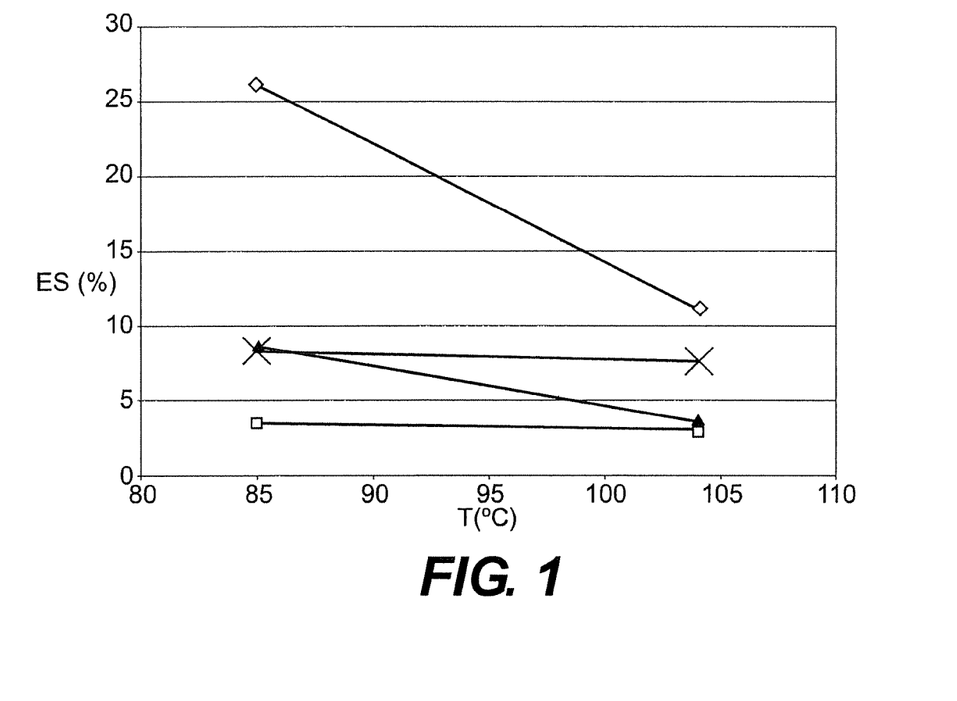
FIG. 1 is a curve giving the level of silicone extractables (SE) (%) as a function of the temperature of the paper (T) in ° C.:
—♦—test 1
—■—test 2
—▲—test 3
—☒—test 4

It is clearly seen that the crosslinking agent according to the invention with the structure ≡SiH POS (I.2.3): M'MD'D (Tests 2, 3 and 4), makes it possible to obtain the lowest levels of extractables, the mark of better reactivity. By virtue of the invention, formulations are accessible which can be crosslinked at low temperature: 80 to 85° C.

Figure 2:
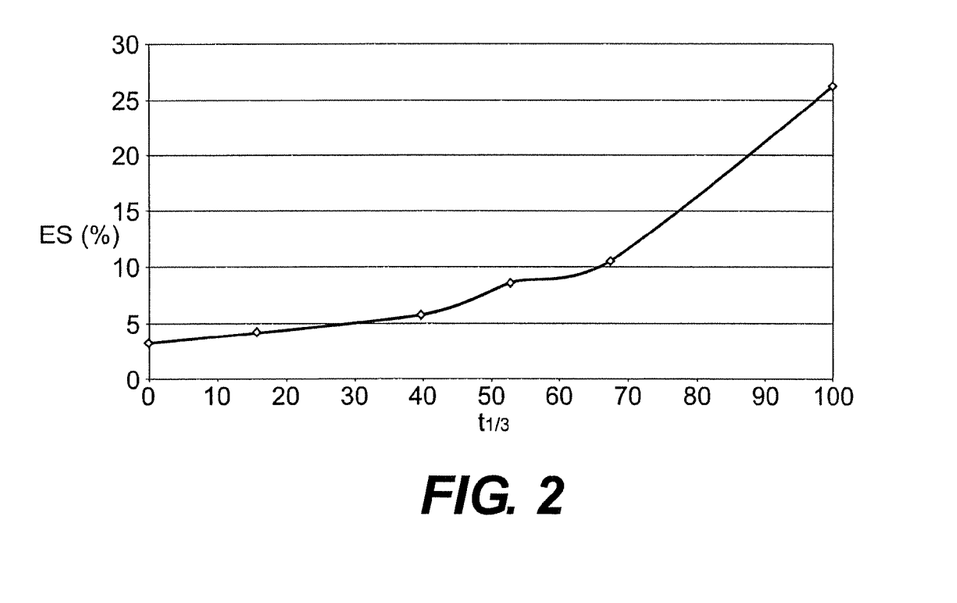
FIG. 2 is a curve giving the level of silicone extractables (SE) (%) as a function of the level (t ⅓) of ≡SiH POS crosslinking agent (I.2.1) in the ≡SiH POS crosslinking agent (I.2.3), crosslinking at 85° C.

Test 3, which corresponds to a mixture of the ≡SiH POS (I.2.1): MDD', and of the ≡SiH POS (I.2.3): MM'DD', and Test 4, which corresponds to (I.2.2): MD'M, + (I.2.3): MM'DD', show, in FIG. 1, that the reactivity (quality of the crosslinking at low temperature) of the mixtures remains very good, while improving the attachment to the flexible support. FIG. 2 shows that the level in the crosslinking agent of structure other than MM'DD', for example (I.2.1): MDD', must not be too high, preferably less than 30%.

-B- TESTS 12 TO 19

A new series of crosslinking agents in accordance (Tests 13, 14, 17 and 19) or not in accordance (Countertests 12, 15, 16 and 18) with the invention was evaluated. The characteristics of these products, ratio $\gamma/\delta=D/D'$ and $\beta/\delta \times 1000=M'/D' \times 1000$, are given in the following Table 2.

The vinylated oil used is (I.1) as defined above and the catalyst is the catalyst (II) as defined above. The SiH/SiVi ratio is kept constant at 1.8 and the level of Pt is 100 ppm.

TABLE 2

| Crosslinking agent | Rub off | Extractables in % | Ratio $\gamma/\delta = D/D'$ | $\beta/\delta \times 1000 = M'/D' \times 1000$ |
|---|---|---|---|---|
| Countertest 12 | 10-OK | 10.0 | 0.208 | 7.15 |
| 13 | 10-OK | 4.4 | 0.52 | 21.2 |
| 14 | 10-OK | 3.4 | 1.5 | 57.2 |
| Countertest 15 | 10-OK | 11.1 | 0 | 26.7 |
| Countertest 16 | 10-OK | 9.1 | 0 | 10 |
| 17 POS (1.2.1) | 10-OK | 3.2 | 1.25 | 36 |
| Countertest 18 | 10-OK | 9.9 | 0.31 | 9 |
| 19 | 10-OK | 4 | 0.8 | 23.3 |

The crosslinking agents in accordance with the invention (Tests 13, 14, 17 and 19) have a good hold in the rub off test and exhibit levels of silicone extractables (SE) of less than 5%, it being known that, in accordance with the invention, SE<9-10%, preferably SE≦7.5% and more preferably still SE≦5%.

2. Detachment Force and Ageing, Tesa 7475 (In-Line)

Figure 3:
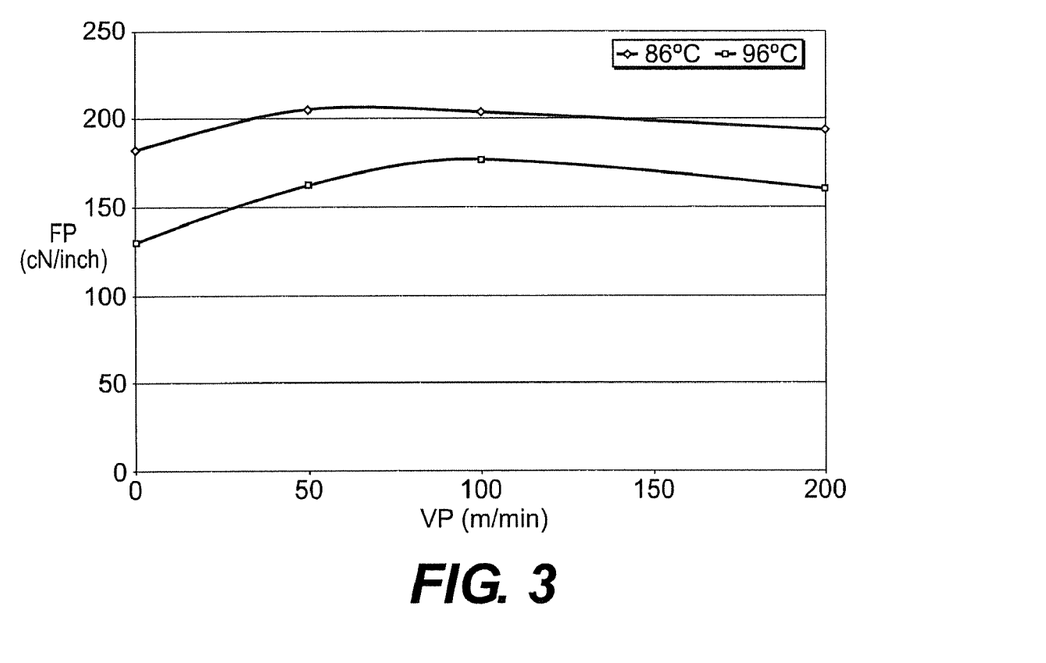
FIG. 3 is a curve giving the peel strength (PS) as a function of the peel rate (PR) at crosslinking temperatures of 86 to 95° C.
Figure 4:
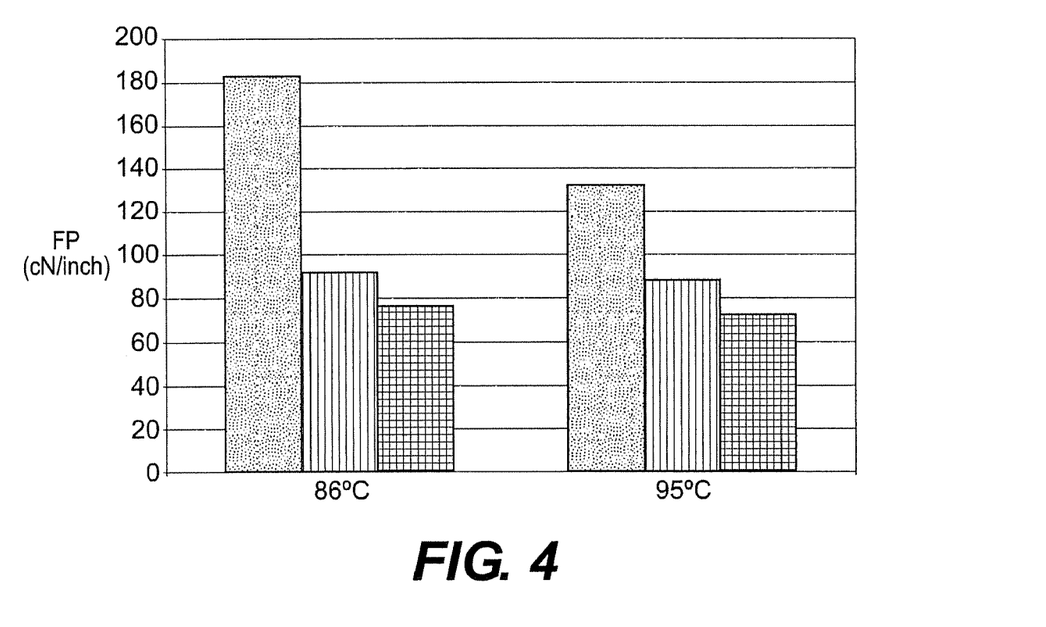
FIG. 4 shows histograms at:
▫ t=0,
▥ t=3 months and
▦ t=4 months
giving the peel strength (PS) for a coating rate of 0.3 m/min and crosslinking temperatures of 86 to 95° C.

The release properties were measured on coatings produced from a silicone formulation comprising a mixture of POS (I.2.3) crosslinking agent (82%)/POS (I.2.2) (18%). The peel profiles obtained and the stabilities towards ageing of these release properties are shown in FIGS. 3 and 4. It is apparent that the ≡SiH POS crosslinking agent according to the invention does not affect these release properties or their stability over time.

What is claimed is:

1. A process to form a water-repellant and release coating on a support, the process comprising applying a silicone composition, that is capable of crosslinking by polyaddition, to the support and then crosslinking the silicone composition, wherein the silicone composition comprises as a crosslinking agent,
at least one silicone oil comprising at least one hydrogenated PolyOrganoSiloxane (POS) exhibiting, per molecule at least three hydrogen atoms bonded to silicon atoms, and having the following mean linear formula:

$$M_\alpha M'_\beta D_\gamma D'_\delta$$

with $M=(R^1)_3SiO_{1/2}$
$M'=H_a(R^1)_bSiO_{1/2}$, a+b=3, a=1, 2 or 3,
b=0 to 3
$D=(R^2)_2SiO_{2/2}$
$D'=HR^3SiO_{2/2}$ 
$0 \leq \alpha \leq 2$
$0 < \beta \leq 2$
$0 < \gamma$
$0 < \delta$
wherein $R^1$, $R^2$ and $R^3$ are each a monovalent hydrocarbon group which has no unfavorable effect on the activity of the catalyst
and with:
$0 < \gamma/\delta$,
$15 \leq (\beta/\delta) \times 1000 \leq 150$,
the POS or POSs having a dynamic viscosity η at 25° C. of less than or equal to 1500 mPa·s, and the support is flexible and is comprised of at least one material selected from the group consisting of polyethylene, polypropylene, polyester, poly(vinyl chloride), polyethylene terephthalate and mixtures thereof,
wherein the crosslinking of said silicone composition occurs by placing the support coated with said silicone composition at a temperature of less than or equal to 110° C.

2. The process of claim 1, wherein the silicone composition is crosslinked at a temperature less than or equal to 110° C.

3. The process of claim 1, wherein $0 \leq \gamma/\delta \leq 1.8$.

4. The process of claim 1, wherein the monovalent hydrocarbon group is an alkyl group having from 1 to 8 carbons atoms, or an aryl group.

5. The process of claim 4, wherein the monovalent hydrocarbon group is selected from the group consisting of methyl, ethyl, propyl and 3,3,3, trifluoropropyl.

6. The process of claim 4, wherein the monovalent hydrocarbon group is an aryl selected from the group consisting of xylyl, tolyl and phenyl radicals.

7. The process of claim 1, wherein the silicone composition is crosslinked at a temperature less than or equal to 100° C.

8. The process of claim 1, wherein the silicone composition is crosslinked at a temperature between 75 and 95° C.

9. The process of claim 1, wherein the silicone composition is crosslinked at said temperature for less than 60 seconds.

10. The process of claim 1, wherein the silicone composition is crosslinked at said temperature for less than 10 seconds.

11. A process to form a water-repellent and release coating on a support, the process comprising applying a silicone composition, that is capable of crosslinking by polyaddition, to the support and then crosslinking the silicone composition, the silicone composition comprising as a crosslinking agent at least one silicone oil comprising at least one hydrogenated PolyOrganoSiloxane (POS) exhibiting, per molecule, at least three hydrogen atoms bonded to silicone atoms, and having the following mean linear formula:

$$M_\alpha M'_\beta D_\gamma D'_\delta$$

with $M=(R^1)_3 SiO_{1/2}$
$M'=H_a(R^1)_b SiO_{1/2}$, a+b=3, a=1, 2 or 3,
b=0 to 3
$D=(R^2)_2 SiO_{2/2}$
$D'=HR^3 SiO_{2/2}$
$0 \leq \alpha \leq 2$
$0 < \beta \leq 2$
$0 < \gamma$
$0 < \delta$ wherein $R^1$, $R^2$ and $R^3$=a monovalent hydrocarbon group, which has no unfavorable effect on the activity of the catalyst and with:
$0 < \gamma/\delta$,
$15 \leq (\beta/\delta) \times 1000 \leq 150$;

the POS or POSs having a dynamic viscosity η at 25° C. of less than or equal to 1500 mPa·s, wherein the crosslinking POS exhibits an ≡SiH/≡Si-alkenyl (Vi) molar ratio such that:
$1.0 \leq \equiv SiH/\equiv Si\text{-alkenyl (Vi)} \leq 4$, and the support is flexible and is comprised of at least one material selected from the group consisting of polyethylene, polypropylene, polyester, poly(vinyl chloride), polyethylene terephthalate and mixtures thereof,
wherein the crosslinking of said silicone composition occurs by placing the support coated with said silicone composition at a temperature of less than or equal to 110° C.

12. The process of claim 11, wherein the crosslinking POS ≡SiH/≡Si-alkenyl (Vi) molar ratio is such that: $1.4 \leq \equiv SiH/\equiv Si\text{-alkenyl (Vi)} \leq 3$.

13. The process of claim 11, wherein the POS is a product comprising units of formula:

$$W_a Z_b SiO_{\frac{4-(a+b)}{2}} \quad (I.1)$$

in which:
W is an alkenyl group,
Z is a monovalent hydrocarbonaceous group which has no unfavorable effect on the activity of the catalyst and which is selected from alkyl groups having from 1 to 8 carbon atoms inclusive, and from aryl groups,
a is 1 or 2, b is 0, 1 or 2 and a +b is between 1 and 3.

14. The process of claim 11, wherein the silicone composition further comprises at least one adhesion-adjusting system and/or one agent for inhibiting hydrosilylation.

15. The process of claim 11, wherein the POS is a blocked linear polydiorganosiloxane comprising "Si-alkenyl" functional groups, exhibiting a viscosity of 100 to 1000 mPa·s and a level of alkenyl functional groups La, expressed as equivalent number of alkenyl functional groups per 100 g of oil, of:
$0.010 \leq La$.

16. The process of claim 11, wherein the oil used as the crosslinking agent comprises at least one POS comprising ≡SiH functional groups and exhibits a viscosity of the order of 5 to 150 mPa·s.

17. The process of claim 11, wherein the composition is provided in the form of an aqueous emulsion/dispersion.

18. The process of claim 11, wherein the monovalent hydrocarbon group is an alkyl group having from 1 to 8 carbons atoms, or an aryl group.

19. The process of claim 18, wherein the monovalent hydrocarbon group is selected from the group consisting of methyl, ethyl, propyl and 3,3,3, trifluoropropyl.

20. The process of claim 18, wherein, the monovalent hydrocarbon group is an aryl selected from the group consisting of xylyl, tolyl and phenyl radicals.

21. The process of claim 11, wherein the silicone composition is crosslinked at said temperature for less than 60 seconds.

22. The process of claim 11, wherein the silicone composition is crosslinked at said temperature for less than 10 seconds.

23. A process to form a water-repellent and release coating on a support, the process comprising applying a silicone composition, that is capable of crosslinking by polyaddition, to the support and then crosslinking the silicone composition wherein:
the silicone composition comprises:
(a) at least one POS exhibiting, per molecule, at least two alkenyl groups bonded to silicone atoms,
(b) at least one silicone oil comprising at least one hydrogenated linear PolyOrganoSiloxane (POS) exhibiting, per molecule, at least three hydrogen atoms bonded to silicone atoms, and having the following mean linear formula:

$$M_\alpha M'_\beta D_\gamma D'_\delta$$

with $M=(R^1)_3 SiO_{1/2}$
$M'=H_a(R^1)_b SiO_{1/2}$, a+b=3, a=1, 2 or 3,
b=0 to 3
$D=(R^2)_2 SiO_{2/2}$
$D'=HR^3 SiO_{2/2}$ $0 \leq \alpha \leq 2$ $0 < \beta \leq 2$ $0 < \gamma$ $0 < \delta$ wherein $R^1$, $R^2$ and $R^3$=a monovalent hydrocarbon group, which has no unfavorable effect on the activity of the catalyst and with:

$0 < \gamma/\delta$;

$15 \leq (\beta/\delta) \times 1000 \leq 150$; and (c) at least one catalyst (II) comprising at least one metal belonging to the platinum group;

and the POS or POSs having a dynamic viscosity η at 25° C. of less than or equal to 1500 mPa·s, and the support is flexible and is comprised of at least one material selected from the group consisting of polyethylene, polypropylene, polyester, poly(vinyl chloride), polyethylene terephthalate and mixtures thereof, wherein the crosslinking of said silicone composition occurs by placing the support coated with said silicone composition at a temperature of less than or equal to 110° C.

24. The process of claim 23, wherein the at least two alkenyl groups are $C_2$-$C_6$ alkenyl groups.

25. The process of claim 23, wherein the monovalent hydrocarbon group is an alkyl group having from 1 to 8 carbons atoms, or an aryl group.

26. The process of claim 25, wherein the monovalent hydrocarbon group is selected from the group consisting of methyl, ethyl, propyl and 3,3,3, trifluoropropyl.

27. The process of claim 25, wherein, the monovalent hydrocarbon group is an aryl selected from the group consisting of xylyl, tolyl and phenyl radicals.

28. The process of claim 23, wherein the silicone composition is crosslinked at said temperature for less than 60 seconds.

29. The process of claim 23, wherein the silicone composition is crosslinked at said temperature for less than 10 seconds.

* * * * *